(12) United States Patent
Shapiro

(10) Patent No.: US 7,995,758 B1
(45) Date of Patent: Aug. 9, 2011

(54) FAMILY OF ENCRYPTION KEYS

(75) Inventor: William M. Shapiro, Palo Alto, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1975 days.

(21) Appl. No.: 11/000,637

(22) Filed: Nov. 30, 2004

(51) Int. Cl.
*H04L 9/00* (2006.01)

(52) U.S. Cl. ........ 380/259; 380/260; 380/277; 380/278; 713/176; 713/171

(58) Field of Classification Search .................... 380/259
See application file for complete search history.

(56) References Cited

U.S. PATENT DOCUMENTS

| | | | |
|---|---|---|---|
| 5,521,980 A | 5/1996 | Brands | |
| 5,586,260 A | 12/1996 | Hu | |
| 5,613,089 A | 3/1997 | Hornbuckle | |
| 5,757,907 A | 5/1998 | Cooper et al. | |
| 5,835,601 A | 11/1998 | Shimbo et al. | |
| 5,864,837 A | 1/1999 | Maimone | |
| 6,006,034 A | 12/1999 | Heath et al. | |
| 6,009,543 A | 12/1999 | Shavit | |
| 6,038,322 A | 3/2000 | Harkins | |
| 6,047,126 A | 4/2000 | Imai | |
| 6,052,469 A * | 4/2000 | Johnson et al. | 380/286 |
| 6,088,694 A | 7/2000 | Burns et al. | |
| 6,240,414 B1 | 5/2001 | Beizer et al. | |
| 6,289,450 B1 | 9/2001 | Pensak et al. | |
| 6,321,242 B1 | 11/2001 | Fogg et al. | |
| 6,327,584 B1 | 12/2001 | Xian et al. | |
| 6,339,825 B2 | 1/2002 | Pensak et al. | |
| 6,363,149 B1 | 3/2002 | Candelore | |
| 6,381,602 B1 | 4/2002 | Shoroff et al. | |
| 6,385,639 B1 | 5/2002 | Togawa | |
| 6,418,214 B1 | 7/2002 | Smythe et al. | |
| 6,449,721 B1 | 9/2002 | Pensak et al. | |
| 6,487,301 B1 | 11/2002 | Zhao | |
| 6,553,490 B1 | 4/2003 | Kottapurath et al. | |

(Continued)

FOREIGN PATENT DOCUMENTS

EP 1 307 000 5/2003

(Continued)

OTHER PUBLICATIONS

Neil M. Haller, "The S/Key™ One-Time Password System", Bellcore, Morristown, New Jersy.

(Continued)

*Primary Examiner* — Nasser Moazzami
*Assistant Examiner* — Fikremariam Yalew
(74) *Attorney, Agent, or Firm* — Fish & Richardson P.C.

(57) ABSTRACT

Systems and techniques relating to cryptographic keys include, in one implementation, a technique involving: generating a symmetric encryption key; and generating from the symmetric encryption key a family of symmetric encryption keys having a relationship such that a descendent key of the family is derivable from each key that is an ancestor of the descendent key in the family. Generating the family of symmetric encryption keys can involve cryptographically hashing the original symmetric encryption key and resulting hashed encryption keys. The technique can further include rolling over a key used in securing information by providing a next symmetric encryption key of the family in an order opposite that of an order of key generation; and a client can cryptographically hash a first symmetric encryption key to produce a second symmetric encryption key of the family and decrypt information associated with an electronic document with the key thus produced.

22 Claims, 3 Drawing Sheets

U.S. PATENT DOCUMENTS

| | | |
|---|---|---|
| 6,564,215 B1 | 5/2003 | Hsiao et al. |
| 6,615,336 B1 | 9/2003 | Chen et al. |
| 6,623,529 B1 | 9/2003 | Lakritz |
| 6,694,434 B1 | 2/2004 | McGee et al. |
| 6,751,336 B2 | 6/2004 | Zhao |
| 6,832,221 B2 | 12/2004 | Takahashi |
| 6,856,976 B2 | 2/2005 | Bible et al. |
| 6,873,976 B2 | 3/2005 | Bible et al. |
| 6,889,210 B1 | 5/2005 | Vainstein |
| 6,889,233 B2 | 5/2005 | Lin et al. |
| 6,895,289 B2 | 5/2005 | Shimizu et al. |
| 6,912,591 B2 | 6/2005 | Lash |
| 6,950,935 B1 | 9/2005 | Allavarpu et al. |
| 6,963,971 B1 | 11/2005 | Bush et al. |
| 6,968,396 B1 | 11/2005 | Schillings et al. |
| 6,978,376 B2 | 12/2005 | Giroux et al. |
| 6,986,039 B1 | 1/2006 | Leah et al. |
| 7,058,605 B2 | 6/2006 | Gupta |
| 7,058,663 B2 | 6/2006 | Johnston et al. |
| 7,062,765 B1 | 6/2006 | Pitzel et al. |
| 7,140,012 B2 | 11/2006 | Pugh et al. |
| 7,143,419 B2 | 11/2006 | Fischer et al. |
| 7,178,033 B1 | 2/2007 | Garcia |
| 7,181,016 B2 | 2/2007 | Cross et al. |
| 7,197,638 B1 | 3/2007 | Grawrock et al. |
| 7,209,559 B2 | 4/2007 | Rodriguez et al. |
| 7,233,981 B2 | 6/2007 | Tenereilo et al. |
| 7,237,189 B2 | 6/2007 | Altenhofen et al. |
| 7,254,235 B2 | 8/2007 | Boudreault et al. |
| 7,260,555 B2 | 8/2007 | Rossman et al. |
| 7,346,908 B2 | 3/2008 | Evans et al. |
| 7,353,397 B1 | 4/2008 | Herbach |
| 7,367,060 B2 | 4/2008 | Someshwar |
| 7,370,344 B2 | 5/2008 | Boozer et al. |
| 7,380,120 B1 | 5/2008 | Garcia |
| 7,430,541 B2 | 9/2008 | Seo et al. |
| 7,434,048 B1 | 10/2008 | Shapiro et al. |
| 7,437,614 B2 | 10/2008 | Haswell et al. |
| 7,515,717 B2 | 4/2009 | Doyle et al. |
| 7,676,674 B2 | 3/2010 | Bush et al. |
| 2001/0044901 A1 | 11/2001 | Grawrock |
| 2001/0056541 A1 | 12/2001 | Matsuzaki et al. |
| 2002/0019936 A1 | 2/2002 | Hitz et al. |
| 2002/0019943 A1 | 2/2002 | Cho et al. |
| 2002/0046176 A1 | 4/2002 | Seo et al. |
| 2002/0073080 A1 | 6/2002 | Lipkin |
| 2002/0077985 A1 | 6/2002 | Kobata et al. |
| 2002/0077986 A1 | 6/2002 | Kobata et al. |
| 2002/0078081 A1 | 6/2002 | Bierbrauer et al. |
| 2002/0082997 A1 | 6/2002 | Kobata et al. |
| 2002/0083183 A1 | 6/2002 | Pujare et al. |
| 2002/0087876 A1 | 7/2002 | Larose |
| 2002/0091640 A1 | 7/2002 | Gupta |
| 2002/0095407 A1 | 7/2002 | Itakura et al. |
| 2002/0108050 A1 | 8/2002 | Raley et al. |
| 2002/0112171 A1 | 8/2002 | Ginter et al. |
| 2002/0120791 A1 | 8/2002 | Somalwar et al. |
| 2002/0124109 A1 | 9/2002 | Brown |
| 2002/0138617 A1 | 9/2002 | Christfort et al. |
| 2002/0141593 A1* | 10/2002 | Kurn et al. .................... 380/286 |
| 2002/0144257 A1 | 10/2002 | Matsushima |
| 2002/0162104 A1 | 10/2002 | Raike et al. |
| 2002/0197528 A1 | 12/2002 | Zunke |
| 2003/0023657 A1 | 1/2003 | Fischer et al. |
| 2003/0028899 A1 | 2/2003 | MacInnis |
| 2003/0055927 A1 | 3/2003 | Fischer et al. |
| 2003/0056179 A1 | 3/2003 | Mori |
| 2003/0061165 A1 | 3/2003 | Okamoto et al. |
| 2003/0065739 A1 | 4/2003 | Shnier |
| 2003/0065936 A1 | 4/2003 | Wray |
| 2003/0105740 A1 | 6/2003 | Shimizu et al. |
| 2003/0109943 A1 | 6/2003 | Shimizu et al. |
| 2003/0110131 A1 | 6/2003 | Alain et al. |
| 2003/0117434 A1 | 6/2003 | Hugh |
| 2003/0120601 A1 | 6/2003 | Ouye et al. |
| 2003/0133805 A1 | 7/2003 | Stoker |
| 2003/0135650 A1 | 7/2003 | Kano et al. |
| 2003/0152235 A1* | 8/2003 | Cohen et al. .................. 380/278 |
| 2003/0154071 A1 | 8/2003 | Shreve |
| 2003/0187929 A1 | 10/2003 | Pugh et al. |
| 2003/0191917 A1 | 10/2003 | McBrearty et al. |
| 2003/0196120 A1 | 10/2003 | Raley et al. |
| 2003/0196121 A1 | 10/2003 | Raley et al. |
| 2003/0202661 A1 | 10/2003 | Rodriguez et al. |
| 2003/0208686 A1 | 11/2003 | Thummalapally et al. |
| 2003/0217264 A1 | 11/2003 | Martin et al. |
| 2003/0232318 A1* | 12/2003 | Altenhofen et al. .......... 434/362 |
| 2004/0030702 A1 | 2/2004 | Houston et al. |
| 2004/0049519 A1 | 3/2004 | Itakura et al. |
| 2004/0049571 A1 | 3/2004 | Johnson et al. |
| 2004/0059590 A1 | 3/2004 | Mercredi et al. |
| 2004/0093323 A1 | 5/2004 | Bluhm et al. |
| 2004/0103202 A1 | 5/2004 | Hildebrand et al. |
| 2004/0117655 A1 | 6/2004 | Someshwar |
| 2004/0117664 A1 | 6/2004 | Colvin |
| 2004/0146015 A1 | 7/2004 | Cross et al. |
| 2004/0162782 A1 | 8/2004 | Bible et al. |
| 2004/0177276 A1 | 9/2004 | MacKinnon et al. |
| 2004/0249765 A1 | 12/2004 | Leon |
| 2004/0255048 A1 | 12/2004 | Lev Ran et al. |
| 2005/0044378 A1 | 2/2005 | Beard et al. |
| 2005/0071658 A1 | 3/2005 | Nath et al. |
| 2005/0091487 A1 | 4/2005 | Cross et al. |
| 2005/0097061 A1 | 5/2005 | Shapiro et al. |
| 2005/0097441 A1* | 5/2005 | Herbach et al. ............ 715/501.1 |
| 2005/0132083 A1 | 6/2005 | Raciborski et al. |
| 2005/0144463 A1* | 6/2005 | Rossebo et al. ............... 713/185 |
| 2005/0157880 A1* | 7/2005 | Kurn et al. ..................... 380/279 |
| 2005/0223414 A1 | 10/2005 | Kenrich et al. |
| 2006/0002564 A1 | 1/2006 | Aihara et al. |
| 2006/0010324 A1* | 1/2006 | Appenzeller et al. ......... 713/171 |
| 2006/0036548 A1 | 2/2006 | Roever et al. |
| 2006/0090065 A1 | 4/2006 | Bush et al. |
| 2007/0078900 A1 | 4/2007 | Donahue |
| 2007/0127719 A1* | 6/2007 | Selander et al. ............... 380/277 |
| 2008/0097998 A1 | 4/2008 | Herbach |

FOREIGN PATENT DOCUMENTS

| | | |
|---|---|---|
| EP | 1 326 157 | 7/2003 |
| EP | 1 528 455 | 5/2005 |
| EP | 1 680 727 | 7/2006 |
| JP | 2000227870 A | 8/2000 |
| JP | 2002080447 A | 3/2002 |
| JP | 2003218851 A | 7/2003 |
| JP | 2003228519 A | 8/2003 |
| JP | 2003228520 A | 8/2003 |
| JP | 2006160301 A | 6/2006 |
| JP | 2007-511821 | 5/2007 |
| JP | 2007295801 A | 11/2007 |
| WO | WO 2005/045709 | 5/2005 |

OTHER PUBLICATIONS

Bill Shapiro, et al., "Offline Access in a Document Control System", U.S. Appl. No. 10/699,124, filed Oct. 31, 2003.

Colin, USPTO Final Office Action in U.S. Appl. No. 10/699,520 mailed Nov. 16, 2007, to be published by USPTO as part of the file history, 25 pages.

Colin, USPTO Non-Final Office Action in U.S. Appl. No. 10/699,520, mailed Nov. 17, 2008, to be published by USPTO as part of the file history, 18 pages.

Colin, USPTO Non-Final Office Action in U.S. Appl. No. 10/699,520, mailed May 12, 2008, to be published by USPTO as part of the file history, 18 pages.

Colin, USPTO Non-Final Office Action in U.S. Appl. No. 10/699,520 mailed Jun. 1, 2007, to be published by USPTO as part of the file history, 23 pages.

DeMarines, "Authentica: Content Security for the Enterprise", Apr. 2, 2002, 18 pages.

Donahue et al., U.S. Appl. No. 10/699,541 "Document Control System", filed Oct. 31, 2003, 69 pages.

Dunn, USPTO Final Office Action in U.S. Appl. No. 10/699,165, mailed Nov. 17, 2008, to be published by USPTO as part of the file history, 19 pages.

Dunn, USPTO Non-Final Office Action in U.S. Appl. No. 10/699,165 mailed Sep. 20, 2007, to be published by the USPTO as part of the file history, 14 pages.

Dunn, USPTO Non-Final Office Action in U.S. Appl. No. 10/699,165, mailed Apr. 16, 2008, to be published by USPTO as part of the file history, 13 pages.
European Search Report & Written Opinion for Application No. EP 04025826.1, dated Mar. 2, 2005, 7 pages.
Examination Report for Application No. EP 04025826.1, dated Sep. 5, 2008, 5 pages.
Examination Report for Application No. EP 04025826.1, dated Oct. 18, 2006, 5 pages.
Examination Report for Application No. EP 04796674.2, dated Mar. 7, 2008, 9 pages.
Examination Report for Application No. EP 04796674.2, dated Aug. 3, 2007, 6 pages.
Herbach et al., U.S. Appl. No. 10/699,165 "Transparent Authentication Process Integration", filed Oct. 31, 2003, 67 pages.
International Preliminary Report on Patentability for Application No. PCT/US2004/035857, dated May 11, 2006, 7 pages.
International Search Report for Application No. PCT/US2004/035857, dated May 20, 2005, 4 pages.
Nowicki, Sunmicrosystems, Inc., NFS: *Network File System Protocol Specification*, Mar. 1989, 27 pages.
Pachura, USPTO Final Office Action in U.S. Appl. No. 10/699,541, mailed Dec. 12, 2008, to be published by USPTO as part of the file history, 19 pages.
Pachura, USPTO Non-Final Office Action in U.S. Appl. No. 10/699,541, mailed Jun. 23, 2008, to be published by USPTO as part of the file history, 32 pages.
PageRecall: The Key to Document Protection, Authentica, Inc. Whitepaper [Retrieved on Oct. 31, 2003]. Retrieved from the Internet: http://www.authentica.com/products/white, 9 pages.
Shapiro, USPTO Final Office Action in U.S. Appl. No. 10/699,124, mailed Dec. 10, 2007, to be published by USPTO as part of the file history, 16 pages.
Shapiro, USPTO Non-Final Office Action in U.S. Appl. No. 10/699,124, mailed Nov. 19, 2008, to be published by USPTO as part of the file history, 16 pages.
Shapiro, USPTO Non-Final Office Action in U.S. Appl. No. 10/699,124, mailed May 13, 2008, to be published by USPTO as part of the file history, 19 pages.
Shapiro, USPTO Office Action in U.S. Appl. No. 10/699,124, mailed Jun. 21, 2007, to be published by USPTO as part of the file history, 16 pages.
Cervetti, USPTO Non-Final Office Action in U.S. Appl. No. 10/699,124 mailed May 14, 2009, to be published by USPTO as part of the file history, 19 pages.
Cervetti, USPTO Non-Final Office Action in U.S. Appl. No. 10/699,124 mailed Nov. 19, 2008, to be published by USPTO as part of the file history, 16 pages.
Cervetti, USPTO Non-Final Office Action in U.S. Appl. No. 10/699,124 mailed May 13, 2008, to be published by USPTO as part of the file history, 19 pages.
Cervetti, USPTO Final Office Action in U.S. Appl. No. 10/699,124 mailed Dec. 10, 2007, to be published by USPTO as part of the file history, 16 pages.
Cervetti, USPTO Non-Final Office Action in U.S. Appl. No. 10/699,124 mailed Jun. 21, 2007, to be published by USPTO as part of the file history, 34 pages.
Bujanska, Iveta, Authorized Officer, European Patent Office, Application No. PCT/US2004/035857, filed Oct. 27, 2004, in International Search Report and Written Opinion, dated May 20, 2005, 9 pages.
Kodama, Muneaki, Examiner, Notice of Reason for Rejection in Japanese Patent Application No. 2004-318250, dated Jun. 29, 2010, 7 pages.
Donahue, James, et al., "Document Control System," U.S. Appl. No. 10/699,541, filed Oct. 31, 2003, to be published by USPTO, 69 pages.
Herbach, Jonathan D., et al., "Transparent Authentication Process Integration," U.S. Appl. No. 10/699,165, filed Oct. 31, 2003, to be published by USPTO, 67 pages.

* cited by examiner

FAMILY OF ENCRYPTION KEYS

CROSS REFERENCE TO RELATED APPLICATIONS

The present application is related to U.S. patent application Ser. No. 10/699,124, filed Oct. 31, 2003, and entitled "OFFLINE ACCESS IN A DOCUMENT CONTROL SYSTEM".

BACKGROUND OF THE INVENTION

The present application describes systems and techniques relating to cryptographic keys, for example, encryption keys used for offline access in a document control system.

Document control systems provide persistent control over access to documents. At a basic level, these systems work by encrypting each document with a cryptographic key and storing the cryptographic key on a server. When a user wishes to access a document, they first authenticate against a server. The server determines if the user has permission to access the specified document and, if so, returns the key needed to open the document. Otherwise, the document remains encrypted and inaccessible.

However, because users are not always online, document control systems typically also provide the option of enabling documents to be accessed when offline. Offline access is accomplished by caching keys on a client machine that can unlock documents that the user is permitted to access. In some systems, a separate key is cached on the client for each document. In other systems, the keys cached on the client may correspond to policies (e.g., company confidential) that grant access to the user or to groups of which the user is a member. The principle behind this approach is that the number of policies or groups in the system is much smaller than the number of documents and, therefore, many fewer keys need to be downloaded from the server and cached on the client, thus offering added scalability. Examples of such systems include those provided by Liquid Machines and Sealed Media.

In addition, many systems also provide re-keying functionality, in which the keys used by the system can be changed in order the limit potential damage in the event that keys are compromised (e.g., a client machine may be infected by a virus that makes the cached keys accessible or a laptop with cached keys may be stolen). Moreover, in various communications systems, such as satellite television systems, virtual private network (VPN) systems and Internet-based Secure Sockets Layer (SSL), encryption keys are periodically re-keyed to limit the value of a compromised key. In such systems, once a key is changed, the old key becomes obsolete.

SUMMARY OF THE INVENTION

In general, in one aspect, the invention features a software product that causes one or more data processing apparatus to perform operations including generating a first symmetric encryption key useable to encrypt and decrypt information; and generating from the first symmetric encryption key a family of symmetric encryption keys useable to encrypt and decrypt information, the symmetric encryption keys of the family having a relationship such that a descendent key of the family is derivable from each key that is an ancestor of the descendent key in the family. Generating the family of symmetric encryption keys can involve cryptographically hashing, in sequence, the first symmetric encryption key and resulting hashed encryption keys to produce the family. Additionally, the operations can further include providing the family of symmetric encryption keys along with an indication of a reverse order of the family such that the keys of the family are useable in the reverse order opposite that of key production. Generating the first symmetric encryption key can involve employing a randomized source to produce a 256 bit binary encryption key useable to decrypt binary data that has been encrypted with the 256 bit binary encryption key. Cryptographically hashing the first symmetric encryption key can involve employing a standardized secure hash function.

In another aspect, the invention features a software product that causes one or more data processing apparatus to perform operations including rolling over a symmetric encryption key useable to encrypt and decrypt information, where the rolling over involves providing a new symmetric encryption key from which an old symmetric encryption key is derivable. The old symmetric encryption key can be derivable from the new symmetric encryption key by cryptographically hashing the new symmetric encryption key. The new and old symmetric encryption keys can be part of a first family of encryption keys of size N, and the rolling over can further involve providing an encryption key from a second family of encryption keys once keys from the first family have been used.

The operations can further include receiving input specifying the size N; and receiving input specifying when to perform said rolling over. The first and second families of encryption keys can be used in a document control system to secure documents, and the operations can further include synchronizing offline access information with a client, the offline access information including a key from each of the first family and the second family.

In another aspect, the invention features a software product that causes one or more data processing apparatus to perform operations including cryptographically hashing a first symmetric encryption key one or more times to produce a second symmetric encryption key; and decrypting information associated with an electronic document with the second symmetric encryption key. The information associated with the document can be included within the document or cached separate from the document. Decrypting the information can involve decrypting information in the electronic document with the first symmetric encryption key in addition to the second symmetric encryption key, decrypting another key useable to decrypt the electronic document, or both.

The first symmetric encryption key can be associated with a group of users of a document control system, and decrypting the information can involve decrypting an encrypt dictionary in the electronic document with the second symmetric encryption key. The first symmetric encryption key can be associated with a policy of a document control system, and decrypting the information can involve decrypting the electronic document.

In another aspect, the invention features a system including a document control server that synchronizes offline access information with clients, including sending an encryption key obtained in reverse order from a family of encryption keys generated by cryptographically hashing a first key of the family multiple times to form a total of N keys in the family of encryption keys; and a client that receives the offline access information from the document control server and allows access to an electronic document, when offline, using the encryption key, including cryptographically hashing the encryption key as needed to access historical documents. The document control server can generate the family of encryption keys or receive the family of encryption keys from an encryption key server. The document control server can provide persistent control over access to documents and can include a user interface to receive input specifying the total N and input specifying when to roll over an encryption key.

The invention can be implemented to realize one or more of the following advantages. In a document control system implementation, the offline keys used in the system (encryption keys cached on a client to provide offline access to documents) can be periodically re-keyed (or rolled over) in an efficient and scalable way. Offline keys can be rolled over frequently without also causing an explosion in the number of old offline keys that need to be cached on a client in order to support offline access to historical documents. This can have particular advantages for per-policy and per-group encryption keys.

Per-policy or per-group keys, which are used for offline access, can be periodically changed, thereby limiting the number of future documents that would be compromised if a key is compromised. The frequency with which the keys are changed (or re-keyed) can be configurable. For example, the keys may be changed every week, in which case if a key were compromised, documents secured a week or more later would not be accessible by an attacker that had the compromised key. To enable frequent re-keying in a scalable way, the key rollover is done such that previous keys can be derived from the new key. For example, if a client has the March key for a particular group, the client can easily derive the February and January keys from the March key; these keys all belong to a common family of keys with a one-way computational relationship between them. Therefore, the client does not need to keep all historical keys, and the server does not need to send all historical keys to the client, just the most recent one, from which older keys from the corresponding key family can be derived.

Occasionally, such as every one hundred re-keys, an entirely new key and corresponding key family can be created. A client can then be provided with one key from the new key family and one key from the old key family to continue having access to all historical documents. Re-keying can be performed more often, but the number of key families generated, and thus the number of keys cached for offline access, can be much smaller. For example, if each key family provides one hundred re-keys, and the system re-keys an encryption key each month, the system can run for eight years and four months before an entirely new key need be created for the re-keying process. Because the scheme is more scalable, re-keying can happen more frequently, thereby limiting the time window in which a compromised key can be used by an attacker to open new documents that the attacker is not authorized to open.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference symbols in the various drawings indicate like elements.

DETAILED DESCRIPTION

The systems and techniques described in this specification can be used in a document control system, such as may be used by an enterprise in connection with document management. The document control system can operate as a stand-alone system or as a component of another system. The document control system can provide persistent document security by controlling who can view documents and what can be done with them, regardless of where the document resides. In this specification, the terms "document" and "electronic document" mean a set of electronic data, including both electronic data stored in a file and electronic data received over a network. An electronic document does not necessarily correspond to a file. A document may be stored in a portion of a file that holds other documents, in a single file dedicated to the document in question, or in a set of coordinated files. Additionally, in this specification, the term "periodically" means recurring from time to time, and does not require regular intervals.

Figure 1:
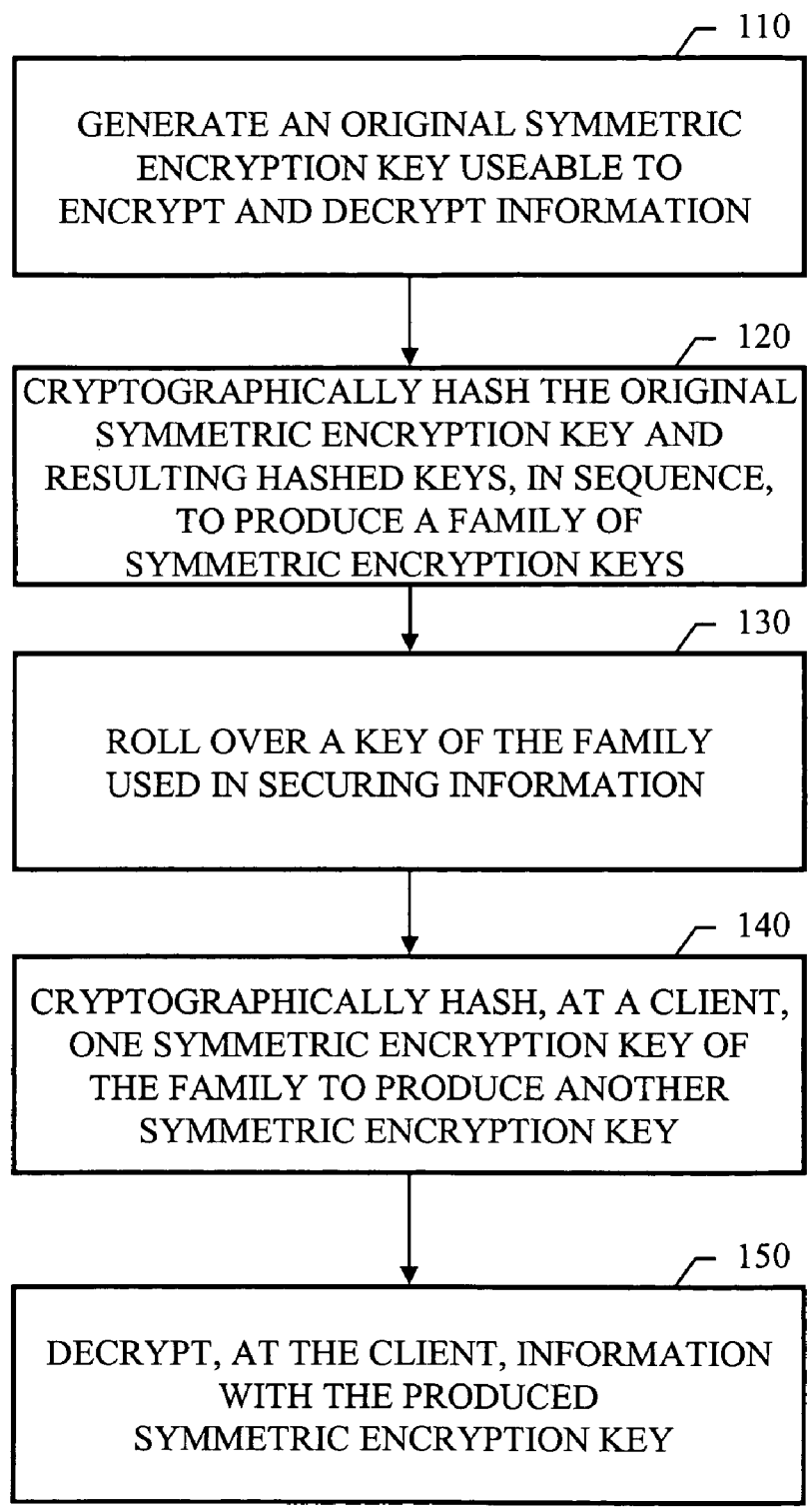
FIG. 1 is a flow chart showing a process of generating and using a family of symmetric encryption keys.

FIG. 1 is a flow chart showing a process of generating and using a family of symmetric encryption keys. A symmetric encryption is one that is used both for encryption and decryption. An original symmetric encryption key is generated (110). This key is useable to encrypt and decrypt information, such as a document in a document management system. The term "original" indicates that the key is a starting key from which other keys are derived and does not imply a requirement of uniqueness for the key or that the key not be derived from some other key.

The original key is cryptographically hashed along with resulting hashed keys, in sequence, to produce a family of symmetric encryption keys (120) that are separately useable to encrypt and decrypt information. This family can include the original key and can have a size N selected as desired for the planned use. For example, in the offline document access model described below, if the key is intended to be rolled over one hundred times before a new key family is to be used, the key is hashed at least one hundred times. The following notation is used below to refer to the keys of a family: $KX=H(X, K0)$, which denotes that key number X (KX) of the family is generated by taking the first key (K0) and applying a hash function (H) X times.

An encryption key of the generated family, which is used in securing information, can be rolled over (130) when needed. The keys in the family can be used in an order opposite that of their generation (e.g., the last key can be used first and the first key last), and rolling over a key can involve moving back up through the keys of the family to the next key closer to the first key generated. For example, K100 can be distributed as an initial key used in securing documents, and when a new key is needed, K99 can be distributed as the next key used in securing documents (note that "securing documents" includes indirect means of securing documents, such as by encrypting a document key with K99, as described further below). Older documents secured with K100 can still be accessed with K99 by hashing K99 once to obtain K100. The next key rollover is then to K98, and so on.

K(X+1) can always be derived from KX, but KX cannot in practice be derived from K(X+1) due to the one-way nature of the hash function. After one hundred key rollovers, current clients in a document control system need only have K0 cached locally to be given offline access to the historical documents secured using keys K100 through K1. Thus, key rollover can be performed more often using this invention while at the same time reducing the number of keys that need to be cached on a client for offline access in a document control system.

In general, a client can use one or more keys from a hashed key family to decrypt information. One symmetric encryption key of the family can be cryptographically hashed (140), at a client, one or more times to produce another symmetric encryption key of the family. Information in an electronic document can be decrypted (150) at the client with the produced symmetric encryption key, and also potentially with the one key and any intermediate keys there between. For example, different parts of a document can be encrypted with different keys from the family. Thus, the extent of access to information at the client can be governed, at least in part, by which key in the family of keys is provided to the client.

Figure 2:
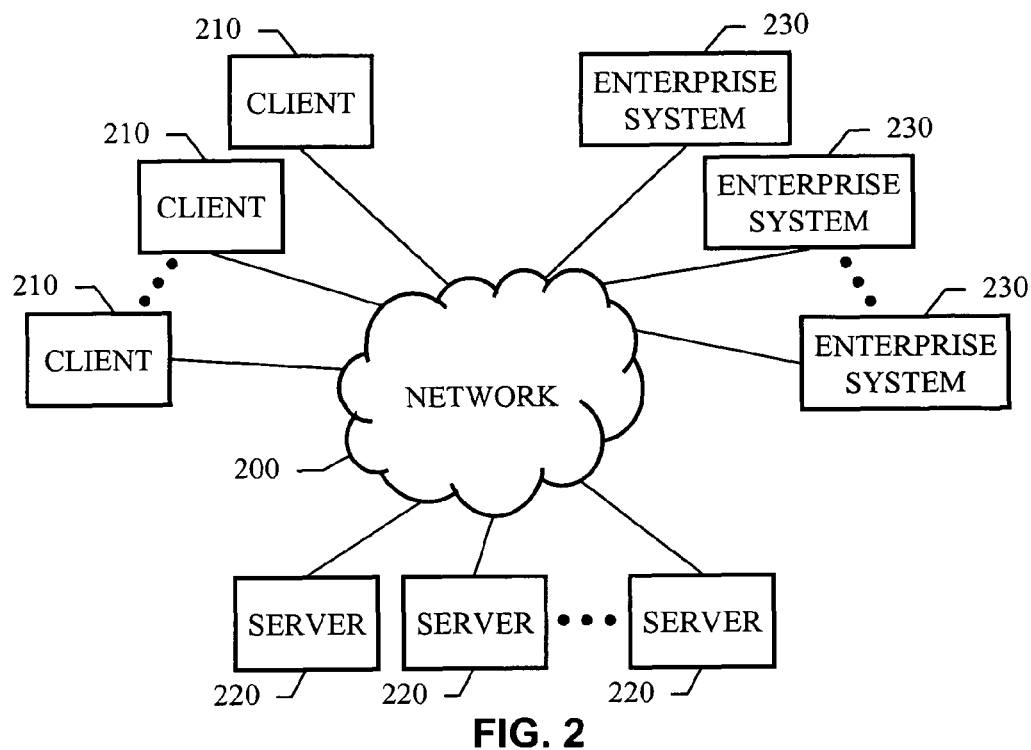
FIG. 2 is a block diagram showing an operational environment for a document control system.

FIG. 2 is a block diagram showing an operational environment for a document control system. A network (200) provides communication links between one or more clients (210), one or more servers (220), and one or more enterprise systems (230). The network (200) may be any communication network linking machines capable of communicating using one or more networking protocols, including a local area network (LAN), metropolitan area network (MAN), wide area network (WAN), enterprise network, virtual private network (VPN), the Internet, or combinations of these. A client (210) can be any machine(s) or process(es) capable of communicating over the network (200) with a server (220), and the server (220) can be any machine(s) or process(es) capable of communicating over the network (200) with an enterprise system (230). Moreover, the client(s) (210) can also communicate with the enterprise system(s) (230).

The enterprise system(s) (230) can be a storage system, an authentication system, a communication system, a document management system, or combinations of these. The server(s) (220) can be designed to tightly integrate with existing enterprise system(s) (230) and leverage existing enterprise infrastructure. For example, the server(s) (220) can provide rich support for user and group information in enterprises, where such information may come from multiple sources. The server(s) (220) can provide document security while being minimally obtrusive, making the system easier to use and thus easier to deploy effectively. For example, the server(s) (220) can implement a document control system that provides a sophisticated offline-access mechanism that allows users to view documents while offline, even if they have not previously viewed the document while online. Thus, the document control system can maintain a low-profile during normal operation, making the presence of document security less visible, and thus more usable.

Additional details regarding example document control system(s) and server(s) can be found in U.S. patent application Ser. No. 10/699,124, filed Oct. 31, 2003, and entitled "OFFLINE ACCESS IN A DOCUMENT CONTROL SYSTEM", which is hereby incorporated by reference.

Figure 3:
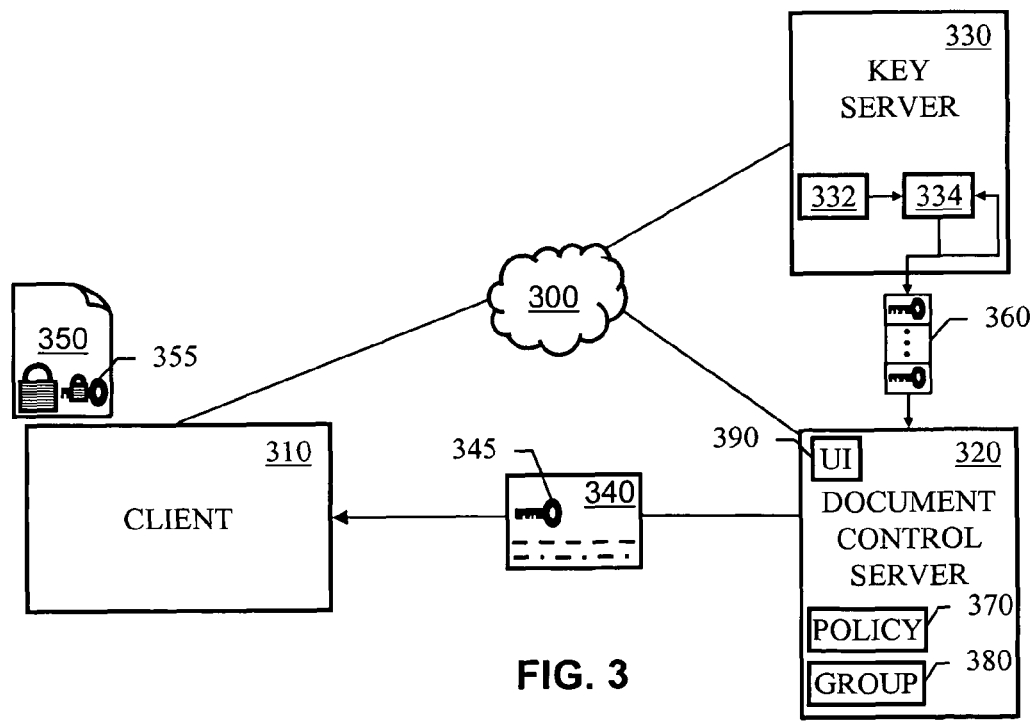
FIG. 3 is a block diagram showing an offline document access model as can be used in a document control system.

FIG. 3 is a block diagram showing an offline document access model as can be used in a document control system. A client (310) can be communicatively coupled with a document control server (320) via a network (300). The document control server (320) can provide multiple offline usage models, including a lease model similar to traditional offline access models, where the user must be online the first time a document is accessed and can subsequently access the document offline for a specified period of time, i.e., the lease period. In addition, the document control server (320) can provide an initial access model, where the user can be offline when the document is accessed for the first time. In this specification, the term "online" means the client (310) can communicate with the server (320); thus, the client (310) is connected with the network (300), and the server (320) is operational, when the client (310) is online.

The document control server (320) uses encryption keys (e.g., 256 bit keys) to secure documents. These keys can be generated by the document control server (320) or by a separate key server (330). In either case, a key generator with a randomized source (332) and a hash function (334) can be used to generated a family of encryption keys (360). Random number generation can be used to create starting keys (e.g., the Secure Random number generator provided with the .Net framework for a .Net implementation and the java.SecureRandom class for generating random numbers in a Java implementation), and a standardized secure hash function for which it is computationally infeasible to find two messages that hash to the same value (e.g., SHA1) can be used to create the hashed keys of the family. The family of symmetric encryption keys (360) thus produced can be provided along with an indication of a reverse order of the family such that the keys of the family are useable in the reverse order opposite that of key production. For example, the key server (330) can send the family of symmetric encryption keys (360) to the document control server (320) in a group (where the indication of reverse order can be built into the data structure or protocol used to send the group), or the keys (360) can be sent serially (where the indication of reverse order can be the order in which the keys are sent in the series, i.e., the keys are sent individually in an order opposite that of key generation).

The keys of the family (360) can be associated with a policy (370) of the document control system or with a group of users (380) of the document control system. In this specification, a "group of users" included potentially a group of one, i.e., per-user keys. These keys can be used to secure electronic documents, either directly by encrypting the document with the family key, or indirectly by encrypting the document with a document key and encrypting the document key with the family key.

The client (310) and the document control server (320) can periodically synchronize to update any changes to offline access information retained at the client (310), where this offline access information can effectively pre-authorize the client to allow actions with respect to secured documents that have yet to be accessed while the client (310) is connected to the network (300) (e.g., a secured document received via email at the client but not yet opened). The offline access information (340) sent to the client (310) includes at least one current key (345) from the family (360). The offline access information (340) can also include other keys, such as keys from other key families, at least one set of document-permissions information associated with multiple documents, a document revocation list, or combinations of these.

The current key (345) can be used to access a secured electronic document (350) while offline by decrypting a second key (355) in the electronic document (350). The electronic document (350) can include content encrypted with the second key (355), and the electronic document (350) can include the second key (355) encrypted with the current key (345) or a previous key from the family (360). Alternatively, there can be one or more levels of indirection in this key encryption relationship. For example, the current key (345) can be used to decrypt the key (355), which can be used to decrypt another key that is then used to decrypt the content of the document (350). Regardless of the number of levels of indirection and the number of keys employed, the current key (345) can be used to access the secured electronic document (350) while offline by decrypting a second key (355) in the electronic document (350).

If the document (350) is an old document that was secured before one or more key rollovers, the current key (345) can be hashed one or more times to produce an older key that can then be used to decrypt the second key (355). Information about which keys have been used to encrypt keys in the document (350) can be included in the document (350). For example, the document (350) can have a document key (a key specific to that document) encrypted with a principle key (a key specific to a user of the system) that has associated major and minor version information. A major version number can indicate the key family, and a minor version number can indicated the generation within the key family, to which the principal key belongs. Such major and minor version information can be included in the document (350), and a client can readily check whether the document is accessible by comparing this information with the principal keys available, i.e., a check of whether the major version of an available key equals the major version of a key used to encrypt the document key and whether the minor version of the available key is less than or equal to the minor version of the key used to encrypt the document key.

The document control server (320) can be used to control how many encryption keys are included in the family (360). Once the keys of the family (360) have been used, and a new family is generated, the synchronization between the document control server (320) and the client (310) can involve sending both a new key from the new family and the highest level key from the old family (i.e., the key from which all other previously used keys from the old family can be generated). The document control server (320) can include a user interface (390) to receive input specifying the total number of keys to generate for a family, and input specifying when to roll over an encryption key.

Figure 4:
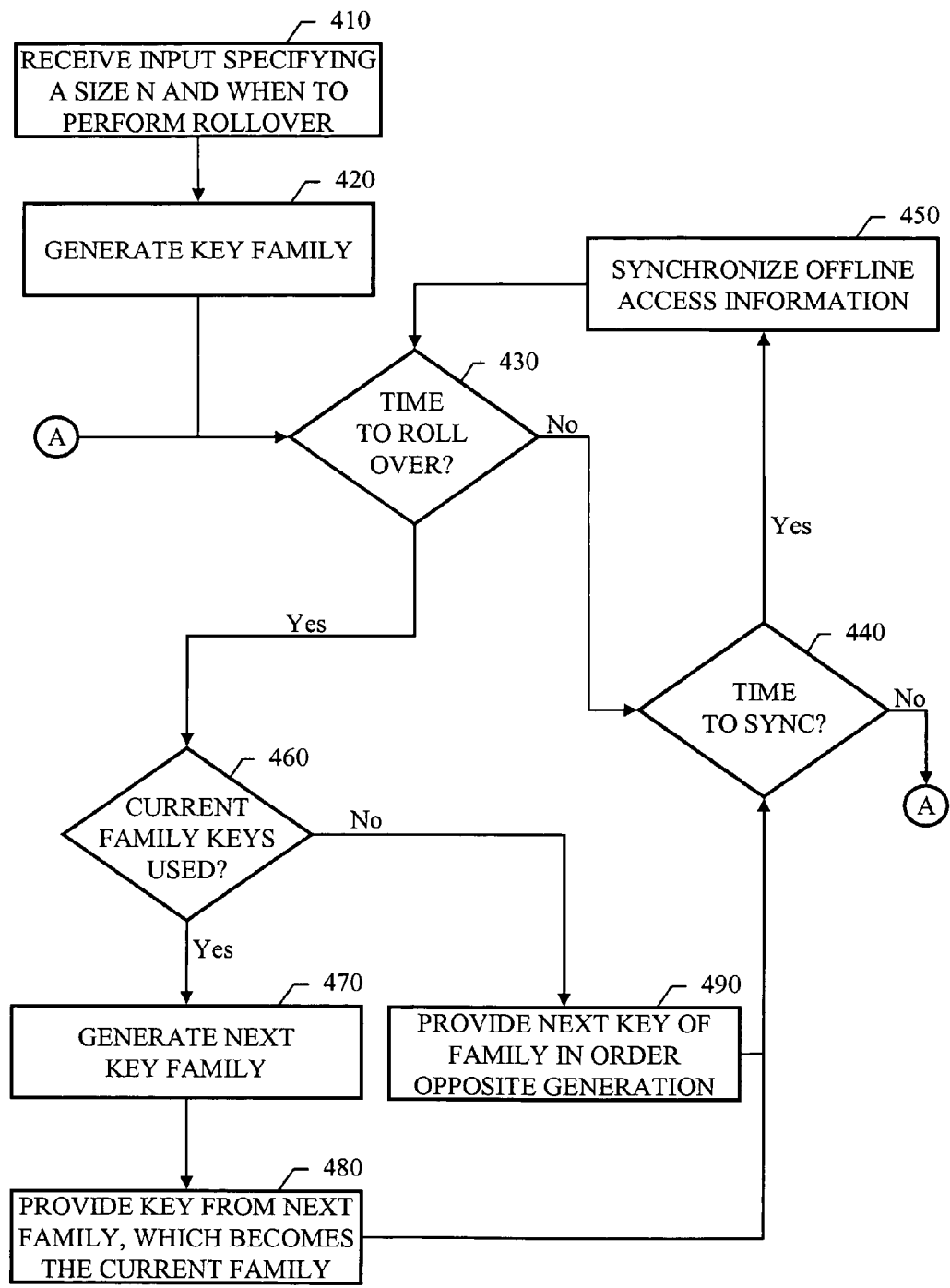
FIG. 4 is a flow chart showing a process of generating and using multiple families of encryption keys for offline document access in a document control system.

FIG. 4 is a flow chart showing a process of generating and using multiple families of encryption keys for offline document access in a document control system. Input is received (410) specifying the size N of each hashed key family to create and also when to perform the rollover. The family size input can specify a common size for all key families or different sizes for different key families. The rollover input can specify a periodic event that should trigger a rollover (e.g., a rollover every month, a rollover after termination of an employee, or both). The rollover input can also specify an immediate rollover, providing direct user control of the rollover trigger.

A first key family is generated (420). When it is time to perform a rollover (430), a check is made to determine whether keys from the current family have been used and a new family of keys is desired (460). Note that not all of the keys from the current family need to be used before a new family is created and used. If the current key family is still to be used, the next key of the current family is provided (490), in an order opposite that of key generation. If a new family of keys is desirable, the next key family is generated (470), and a key from this next key family is provided (480). This next key family then becomes the current key family.

When it is time to perform a synchronization (440), offline access information is synchronized (450) with a client. This synchronization can involve sending one or more K0 keys from previous used key families as well as a current KX key from the current key family. Thus, a client that has synchronized with the server can be easily given access to all historical documents in a document control system with only a few keys despite many prior key rollovers.

The invention and all of the functional operations described in this specification can be implemented in digital electronic circuitry, or in computer software, firmware, hardware, or in combinations of them, such as the structural means disclosed in this specification and structural equivalents thereof. Apparatus of the invention can be implemented as one or more computers located in one or more places. The invention can be implemented as one or more software products (e.g., a computer program product), i.e., one or more software programs tangibly embodied in a machine-readable medium (e.g., in a machine-readable storage device) for execution by, or to control the operation of, data processing apparatus, such as one or more programmable processors or computers. Processing operations of the invention can be performed by a programmable processor executing a program of instructions to perform functions of the invention by operating on input data and generating output.

The invention can be implemented advantageously in one or more software programs (also known as programs, computer programs, software, software applications, or code) written in any form of programming language, including compiled or interpreted languages, for a programmable system including at least one programmable processor coupled to receive data and instructions from, and to transmit data and instructions to, a data storage system, at least one input device, and at least one output device. A software program can be implemented in a high-level procedural or object-oriented programming language, or in assembly or machine language if desired. A software program can be deployed in any form, including as a stand-alone program or as a module, component, subroutine, or other unit suitable for use in a computing environment. A software program does not necessarily correspond to a file. A program can be stored in a portion of a file that holds other programs or data, in a single file dedicated to the program in question, or in multiple coordinated files (e.g., files that store one or more modules, subprograms, or portions of code). A software program can be deployed to be executed on one computer or on multiple computers at one site or distributed across multiple sites and interconnected by a communication network.

The processes and logic flows described in this specification, including the method operations of the invention, can be performed by one or more programmable processors executing one or more computer programs to perform functions of the invention by operating on input data and generating output. The processes and logic flows can also be performed by, and apparatus of the invention can be implemented as, supplemented by, or incorporated in, special purpose logic circuitry, e.g., an FPGA (field programmable gate array) or an ASIC (application-specific integrated circuit).

Processors suitable for execution of a software program include, by way of example, both general and special purpose microprocessors, and any one or more processors of any kind of digital computer. Generally, a processor will receive instructions and data from a read-only memory, a random access memory, a machine-readable signal (e.g., a digital signal received through a network connection), or a combination of these. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be included in a consumer electronic device, e.g., a mobile telephone, a personal digital assistant (PDA), a digital camera, a mobile audio player, a Global Positioning System (GPS) receiver, to name just a few. Media suitable for tangibly embodying software program instructions and data include all forms of non-volatile memory, including by way of example semiconductor memory devices, such as EPROM (electrically programmable read-only memory), EEPROM (electrically erasable programmable read-only memory), and flash memory devices; magnetic disks such as internal hard disks and removable disks; magneto-optical disks; and optical disks, such as CD-ROM disks. Any of the foregoing can be supplemented by, or incorporated in, special purpose logic circuitry.

To provide for interaction with a user, the invention can be implemented on a computer system having a display device, such as a CRT (cathode ray tube) or LCD (liquid crystal display) monitor, for displaying information to the user and a keyboard and a pointing device, such as a mouse or a trackball, by which the user can provide input to the computer system. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. Moreover, the computer system can be programmed to provide a graphical user interface through which software programs interact with users.

The invention has been described in terms of particular embodiments. Other embodiments are within the scope of the following claims. For example, the operations of the invention can be performed in a different order and still achieve desirable results. The invention can be used in a centralized or decentralized document control system. Moreover, the invention can be implemented in many other types of systems. A document access system can be implemented in which the different keys in the family correspond to different current levels of access, such as where having key K5 can correspond to having a first level of access clearance and having key K4 can correspond to having a second, higher level of access clearance, which encompasses that provided by K5. A subscription system can be implemented in which a key corresponds to a subscription to some digital content (movies, songs, etc), and the key can then change monthly to discourage piracy, but the new key can still be used to unlock old content.

What is claimed is:

1. A method comprising:
   generating an original symmetric encryption key useable to encrypt and decrypt information;
   generating from the original symmetric encryption key a family of symmetric encryption keys useable to encrypt and decrypt information, the symmetric encryption keys of the family having a relationship such that a descendent key of the family is derivable from each key that is an ancestor of the descendent key in the family; and
   rolling over a key used in securing information, said rolling over comprising providing a next symmetric encryption key of the family in an order opposite that of an order of key generation;
   wherein said rolling over is performed using a hardware processor; and
   wherein the family of symmetric encryption keys is used in a document control system to secure documents, the method further comprising synchronizing offline access information with a client, the offline access information comprising a key from the family of symmetric encryption keys.

2. The method of claim 1, wherein generating the family of symmetric encryption keys comprises cryptographically hashing the original symmetric encryption key and resulting hashed encryption keys to produce the family.

3. The method claim 2, further comprising:
   cryptographically hashing, at a client, a first symmetric encryption key of the family one or more times to produce a second symmetric encryption key of the family; and
   decrypting, at the client, information associated with an electronic document with the second symmetric encryption key.

4. The method of claim 3, wherein decrypting information comprises decrypting information in the electronic document with multiple symmetric encryption keys from the family.

5. The method of claim 3, wherein decrypting information comprises decrypting another key useable to decrypt the electronic document.

6. The method of claim 3, wherein the first symmetric encryption key is associated with a group of users of a document control system, and said decrypting information comprises decrypting an encrypt dictionary in the electronic document with the second symmetric encryption key.

7. The method of claim 3, wherein the first symmetric encryption key is associated with a policy of a document control system, and said decrypting information comprises decrypting the electronic document.

8. The method of claim 2, further comprising providing the family of symmetric encryption keys along with an indication of a reverse order of the family such that the keys of the family are useable in the reverse order.

9. The method of claim 2, wherein generating the original symmetric encryption key comprises employing a randomized source to produce a 256 bit binary encryption key useable to decrypt binary data that has been encrypted with the 256 bit binary encryption key.

10. The method of claim 2, wherein cryptographically hashing the original symmetric encryption key comprises employing a standardized secure hash function.

11. The method of claim 1, wherein the family of symmetric encryption keys comprises a first family of symmetric encryption keys of size N, and said rolling over further comprises providing an encryption key from a second family of encryption keys once keys from the first family have been used.

12. The method of claim 11, further comprising:
   receiving input specifying the size N; and
   receiving input specifying when to perform said rolling over.

13. A non-transitory machine-readable medium embodying a software product comprising instructions operable to cause one or more data processing apparatus to perform operations comprising:
   rolling over a symmetric encryption key useable to encrypt and decrypt information, said rolling over comprising providing a new symmetric encryption key from which an old symmetric encryption key is derivable;
   wherein the old symmetric encryption key is derivable from the new symmetric encryption key by cryptographically hashing the new symmetric encryption key;
   wherein the new and old symmetric encryption keys are part of a first family of encryption keys of size N, and said rolling over further comprises providing an encryption key from a second family of encryption keys once keys from the first family have been used; and
   wherein said first and second families of encryption keys are used in a document control system to secure documents, the operations further comprising synchronizing offline access information with a client, the offline access information comprising a key from each of the first family and the second family.

14. The non-transitory machine-readable medium of claim 13, the operations further comprising:
   receiving input specifying the size N; and
   receiving input specifying when to perform said rolling over.

15. A non-transitory machine-readable medium embodying a software product comprising instructions operable to cause one or more data processing apparatus to perform operations comprising: cryptographically hashing a first symmetric encryption key one or more times to produce a second symmetric encryption key; and decrypting information associated with an electronic document with the first symmetric encryption key in addition to the second symmetric encryption key wherein said first and second symmetric encryption keys are used in a document control system to secure one or more documents, the operations further comprising synchronizing offline access information with the document control system, the offline access information comprising the first symmetric encryption key.

16. The non-transitory machine-readable medium of claim 15, wherein decrypting information comprises decrypting another key useable to decrypt the electronic document.

17. The non-transitory machine-readable medium of claim 15, wherein the first symmetric encryption key is associated with a group of users of a document control system, and said decrypting information comprises decrypting an encrypt dictionary in the electronic document with the second symmetric encryption key.

18. The non-transitory machine-readable medium of claim 15, wherein the first symmetric encryption key is associated with a policy of a document control system, and said decrypting information comprises decrypting the electronic document.

19. A system comprising:
   a document control server system including hardware, where the server system synchronizes offline access information with clients, including:
      sending an encryption key obtained in reverse order from a family of encryption keys generated by cryptographically hashing a first key of the family multiple times to form a total of N keys in the family of encryption keys,
      along with an indication of the reverse order of the family of encryption keys such that the total of N keys in the family are usable in the reverse order of key generation; and
   a client system including hardware, where the client system receives the offline access information from the document control server system and allows access to an electronic document, when offline, using the encryption key, including cryptographically hashing the encryption key as needed to access historical documents.

20. The system of claim 19, wherein the document control server system generates the family of encryption keys.

21. The system of claim 19, wherein the document control server system receives the family of encryption keys from an encryption key server.

22. The system of claim 19, wherein the document control server system provides persistent control over access to documents and includes a user interface to receive input specifying the total N and input specifying when to roll over an encryption key.

* * * * *